United States Patent
Ozu

(10) Patent No.: US 6,229,837 B1
(45) Date of Patent: May 8, 2001

(54) METAL-VAPOR PULSED LASER

(75) Inventor: Akira Ozu, Ibaraki (JP)

(73) Assignee: Tokai Research Establishment of Japan Atomic Energy Research Institute, Ibaraki (JP)

(*) Notice: Subject to any disclaimer, the term of this patent is extended or adjusted under 35 U.S.C. 154(b) by 0 days.

(21) Appl. No.: 09/181,997

(22) Filed: Oct. 29, 1998

(51) Int. Cl.[7] .............................. H01S 3/00; H01S 3/22; H01S 3/03; H01S 3/097
(52) U.S. Cl. .................. 372/61; 372/38.05; 372/38.07; 372/56; 372/82; 372/86; 372/87
(58) Field of Search ................... 372/61, 87, 38.05, 372/691, 38.07, 56, 82, 86

(56) References Cited

U.S. PATENT DOCUMENTS

| | | | |
|---|---|---|---|
| 3,986,139 | * 10/1976 | Meneely et al. | 331/94.5 |
| 4,669,085 | * 5/1987 | Plourde | 372/12 |
| 4,802,185 | * 1/1989 | Kyusho | 372/86 |
| 4,839,554 | * 6/1989 | Maitland et al. | 313/446 |
| 4,978,929 | * 12/1990 | Knobe | 331/173 |
| 5,048,045 | * 9/1991 | Noda et al. | 372/86 |
| 5,684,814 | * 11/1997 | Hollins et al. | 372/38 |

* cited by examiner

Primary Examiner—Frank G. Font
Assistant Examiner—Armando Rodriguez
(74) Attorney, Agent, or Firm—Wenderoth, Lind & Ponack, L.L.P.

(57) ABSTRACT

The present invention provides a novel metal-vapor pulsed laser capable of being manufactured without using a large-sized laser tube or an expensive discharging circuit. The output and the efficiency of the laser can be improved economically and easily. The laser includes a laser tube having a cathode and an anode. A discharging circuit induces an electric discharge in the laser tube. A grid electrode is mounted close to the cathode of the laser tube. A preliminary discharge is produced between the grid electrode and the cathode to thereby induce a main discharge.

4 Claims, 4 Drawing Sheets

METAL-VAPOR PULSED LASER

FIELD OF THE INVENTION

The present invention relates to a metal-vapor pulsed laser and, more particularly, to a novel high-output, highly efficient, pulsed laser utilized for exciting a dye laser for laser isotopes separation, an amplifier, or a laser adapted for laser beam machining.

BACKGROUND OF THE INVENTION

The conventional metal-vapor pulsed laser uses only two electrodes, i.e., a cathode and an anode, to produce high-output pulsed discharge directly.

However, in order to obtain further improved output and efficiency with this conventional structure using only two such electrodes, it has been necessary to improve the pulsed discharge characteristics by making the equipment such as the laser tube itself bigger, arranging expensive circuit elements in multi-stages, or adding a magnetic compression circuit using a saturable reactor or the like to the discharging circuit. As a result, such discharge circuits ate very complex. Hence, it is not easy to achieve a higher output and a higher efficiency. Additionally, the cost is increased greatly. In this way, various problems have taken place.

Furthermore, the cathode is impacted by ions from a discharging plasma, because an electric discharge is directly produced between the cathode and anode. This accelerates deterioration of the cathode. Consequently, the life of the cathode is short.

SUMMARY OF THE INVENTION

In view of the foregoing, it is an object of the present invention to provide a novel metal-vapor pulsed laser having an output and efficiency that can be improved easily and economically without using a large-scale laser tube or adding an expensive discharging circuit.

This object is achieved in accordance with the teachings of the invention by a metal-vapor pulsed laser comprising a laser tube and a discharging circuit for producing an electric discharge inside the laser tube having a cathode and an anode, the laser being characterized in that a grid electrode is mounted near the cathode of the laser tube. A preliminary discharge is produced between the grid electrode and the cathode. This preliminary discharge induces a main discharge.

Further, the present application is based on the laser described above and characterized in that a peaking capacitor is connected between the anode of the laser tube and the grid electrode.

Further, the present invention is based on the laser described above and characterized in that a static voltage is applied to the cathode or anode, under the condition in which no peaking capacitor is connected between the anode and the grid electrode.

Further, the present invention is based on the laser described above and characterized in that a pulsed discharge is produced.

Still further, the present invention is based on the laser described above and characterized in that the laser is a longitudinal discharge-excited pulsed laser.

Other objects and features of the invention will appear in the course of the description thereof, which follows.

BRIEF DESCRIPTION OF THE DRAWINGS

The foregoing and other objects, features and advantages of the present invention will be better understood from the following detailed description, taken in conjunction with the accompanying drawings, in which.

DETAILED DESCRIPTION OF THE INVENTION

Figure 1:
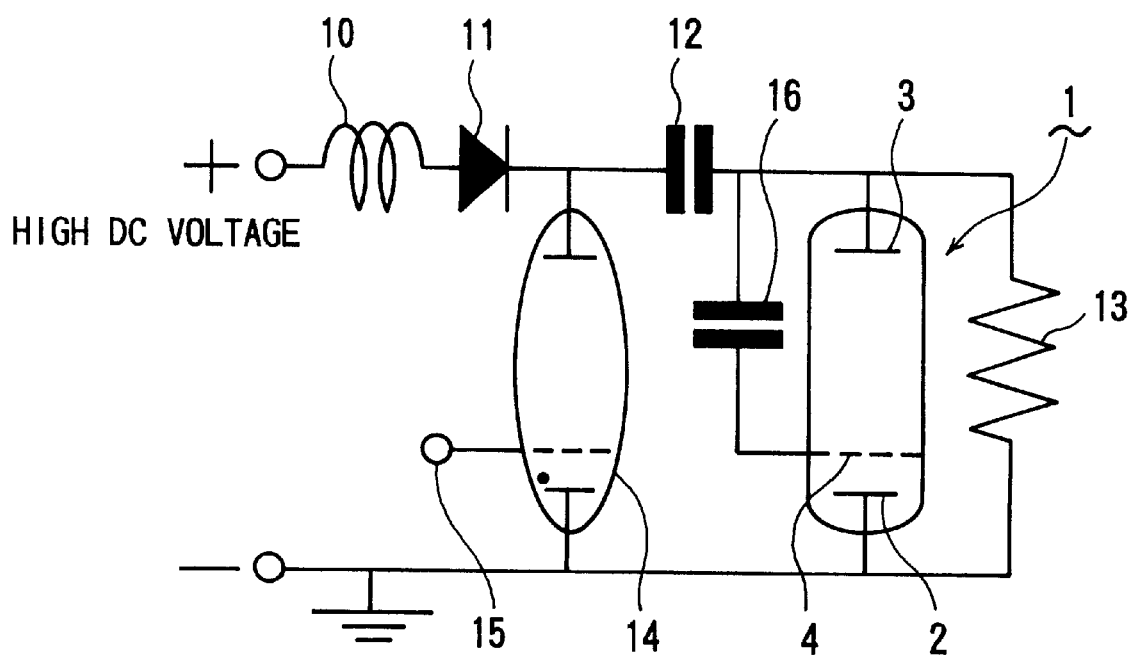
FIG. 1 is a schematic circuit diagram of a metal-vapor pulsed laser in accordance with the present invention.
Figure 2:
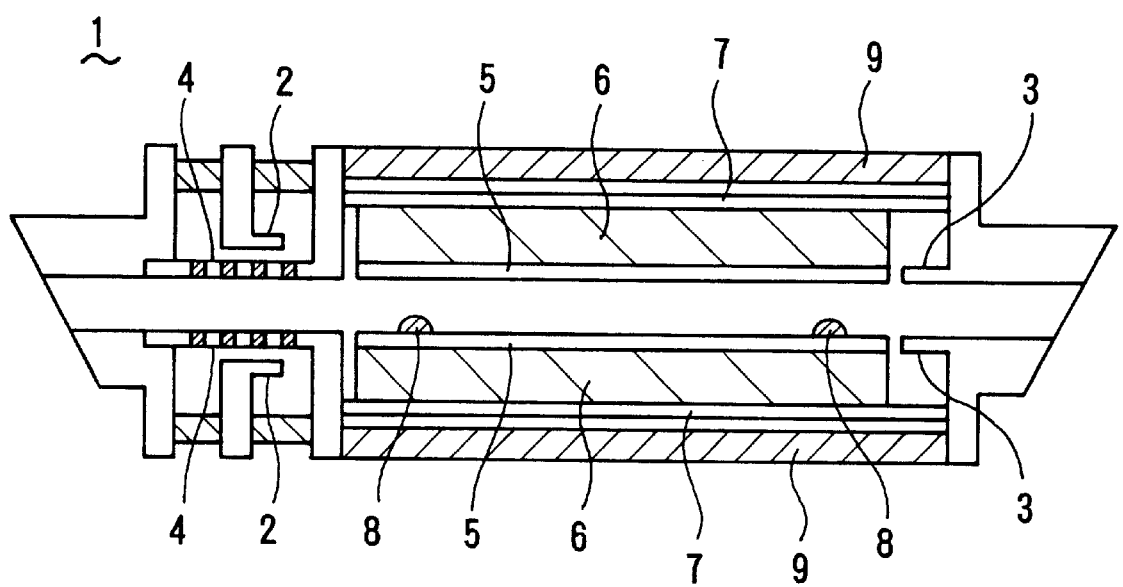
FIG. 2 is a cross-sectional view of main portions of the laser tube of the laser shown in FIG. 1.

FIG. 1 shows one example of circuit configuration of a metal-vapor pulsed laser in accordance with the present invention. FIG. 2 is a cross-sectional view of main portions of a laser tube in the metal-vapor pulsed laser shown in FIG. 1.

The laser shown in FIG. 1 comprises a copper-vapor laser tube 1 and a charge transfer discharge circuit. As shown in FIG. 2, the copper-vapor laser tube 1 has a ceramic tube 5, a heat-insulating material 6, and quartz glass 7 between a cathode 2 and an anode 3. Metal copper 8 is contained in the ceramic tube 5. A water-cooling jacket 9 surrounds the copper-vapor laser tube 1 to water-cool it. A grid electrode 4 is located close to the cathode 2 and surrounds it via an insulator. This grid electrode 4 takes the form of a mesh, for example.

The high voltage charging circuit comprises a choke coil 10, a charging diode 11, a storage capacitor 12, and a charging resistor 13 used for charging the storage capacitor 12 with LC resonant charging. A thyratron 14 having a trigger electrode 15 is connected between the output of the charging diode 11 and the input of the storage capacitor 12 used for discharging.

Further, a peaking capacitor 16 is connected between the grid electrode 4 and the anode 3 of the copper-vapor laser tube 1.

In the metal-vapor laser of the construction described above, electric power is supplied from a high dc voltage source to the storage capacitor 12 via the choke coil 10, the charging diode 11, and the charging resistor 13, and is stored in the storage capacitor 12 used for discharging. When the thyratron 14 acting as a switching device starts a switching operation, current stored in the storage capacitor 12 flows out into the circuit. First, a preliminary discharge is produced between the cathode 2 and the grid electrode 4, giving rise to a preliminary discharge plasma source between the cathode 2 and the grid electrode 4. This triggers a subsequent main discharge between the cathode and the anode. Thus, the laser is smoothly set into operation and produces an output efficiently.

Because of the operation described above, the grid electrode 4 varies the discharging impedance between the cathode 2 and the anode 3. The energy supplied into the copper-vapor laser tube 1 is increased by the discharge. Consequently, the output and the efficiency of the laser are increased.

The grid electrode 4 protects the cathode 2 against the main discharge, and the deterioration of the cathode 2 due to ion impact from the discharging plasma is decreased. This improves the life time.

In the laser of the present invention shown in FIG. 1, the peaking capacitor 16 is connected between the anode 3 and the grid electrode 4. If this peaking capacitor 16 is not connected, for example, a static voltage is applied to the cathode 2 or anode 3 with respect to the grid electrode 4, thereby producing a preliminary discharge between the cathode 2 and the grid electrode 4, thus triggering simultaneously a main discharge between the cathode 2 and the anode 3. Also, a pulsed discharge can produce a preliminary discharge between the cathode 2 and the grid electrode 4, triggering the main discharge at the same time. In this way, the pulsed laser accomplishes high output and high efficiency.

Figure 3:
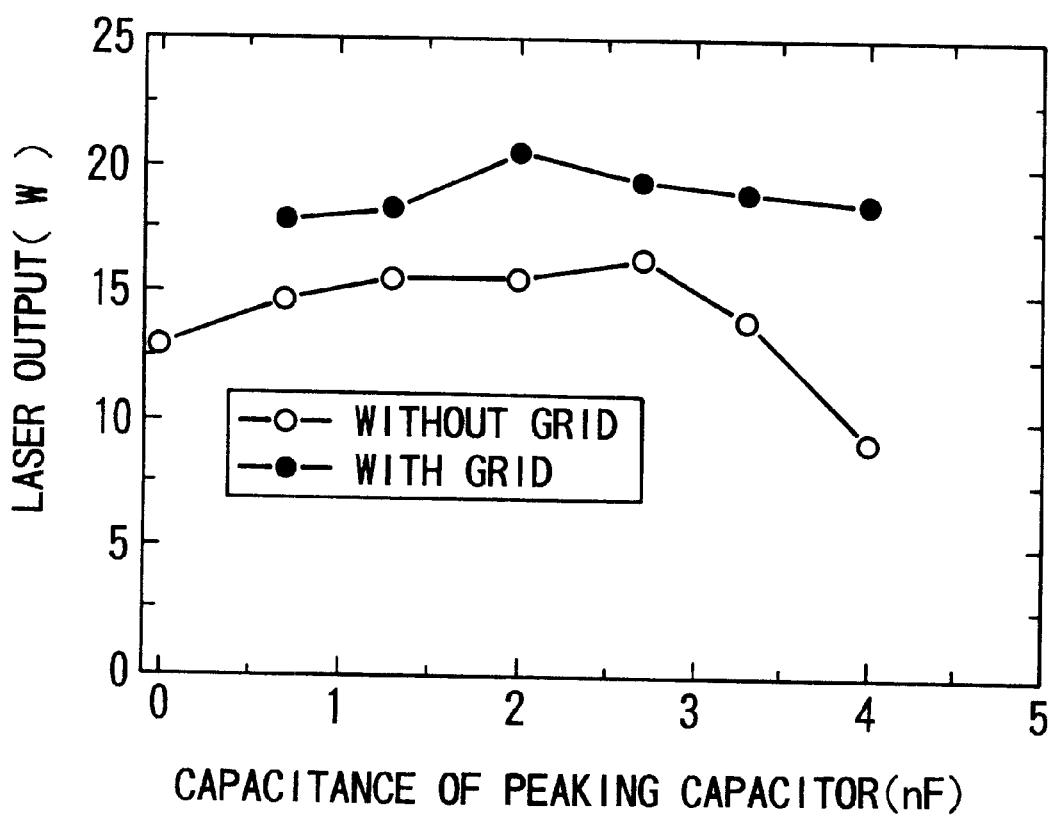
FIG. 3 is a graph comparing the laser output from a metal-vapor pulsed laser in accordance with the invention with the laser output from the prior art laser.

FIG. 3 is a graph comparing the output from the metal-vapor pulsed laser of the present invention of FIG. 1 with the output from the prior art laser. As can be seen from this graph, the laser output depends on the capacitance of the peaking capacitor. The metal-vapor pulsed laser of the present invention fitted with the grid electrode can produce a laser output higher than the output from the prior art laser having no grid electrode by about 30%.

Figure 4:
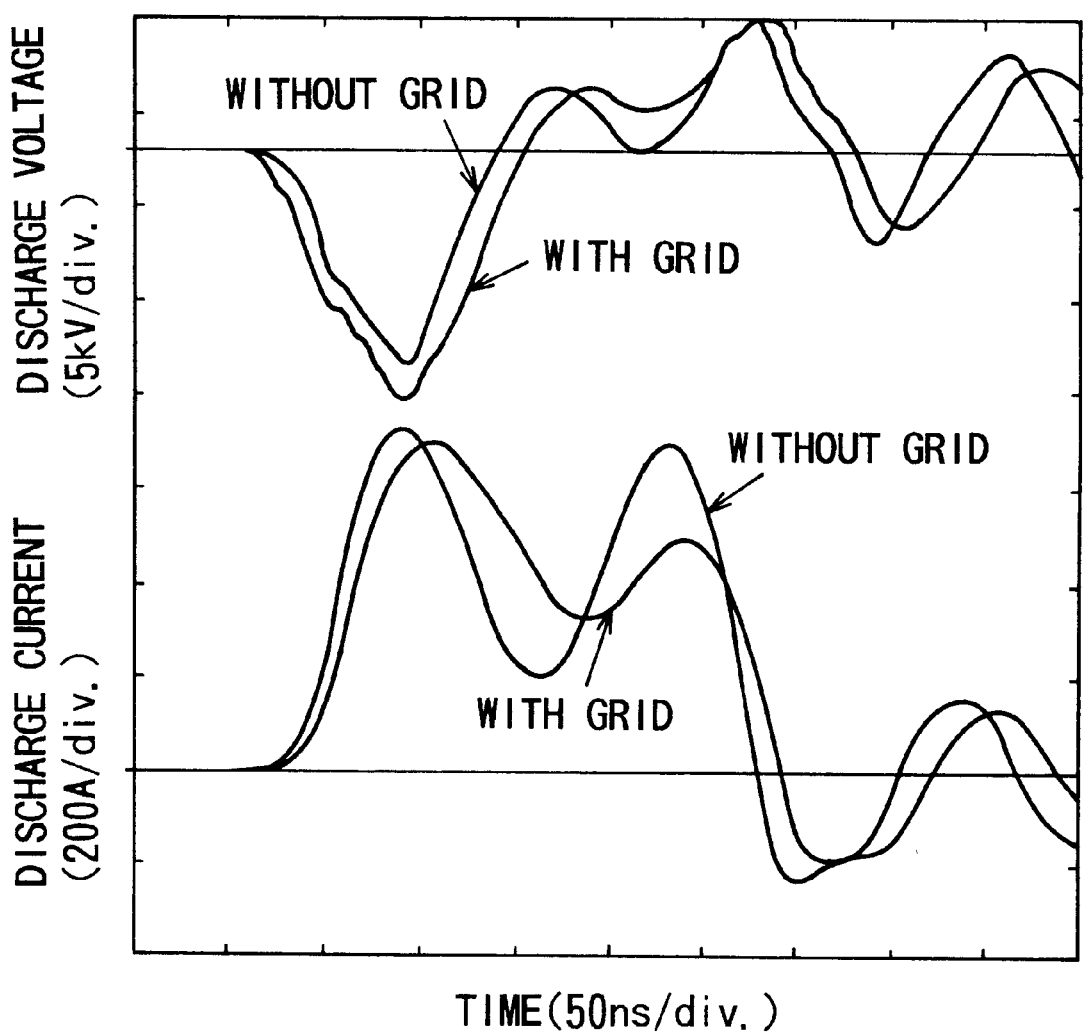
FIG. 4 is a graph comparing the waveforms of discharge voltages and discharge currents when a peaking capacitor of 2 nF is used.

FIG. 4 is a graph comparing the waveforms of discharge voltages and discharge currents produced in the present invention and the prior art when the peaking and the storage capacitor have a capacitance of 2 nF and 5nF, respectively. As can be seen from the graph of FIG. 4, the discharge voltage of the present laser is higher than the discharge voltage of the prior art laser by approximately 10% because of an increase in the discharge impedance caused by the grid electrode.

It is to be understood that the present invention is not limited to the embodiments described above and that various changes and modifications are possible within the scope of the invention delineated by the appended claim.

As described in detail thus far, the present invention provides a novel and inexpensive metal-vapor pulsed laser that does not use a large-sized laser tube or an expensive discharging circuit and produces high pulsed laser output with improved efficiency.

What is claimed is:

1. A metal-vapor pulsed laser comprising:
   a laser tube having a cathode and an anode;
   a discharging circuit operable to induce an electric discharge in said laser tube;
   a grid electrode mounted close to said cathode of said laser tube; and
   a peaking capacitor connected between said anode of said laser tube and said grid electrode;
   wherein a preliminary discharge is produced between said grid electrode and said cathode of said laser tube, thus inducing a main discharge between said cathode and said anode of said laser tube.

2. A metal-vapor pulsed laser comprising:
   a laser tube having a cathode and an anode;
   a discharging circuit operable to induce an electric discharge in said laser tube; and
   a grid electrode mounted close to said cathode of said laser tube;
   wherein a static voltage is applied to said cathode or said anode of said laser tube with respect to said grid electrode, provided with no peaking capacitor connected between said anode of said laser tube and said grid electrode, thereby producing a preliminary discharge between said grid electrode and said cathode of said laser tube, thus inducing a main discharge between said cathode and said anode of said laser tube.

3. The metal-vapor pulsed laser of claim 1, wherein said pulsed laser is a vertical discharge-excited pulsed laser.

4. The metal-vapor pulsed laser of claim 2, wherein said pulsed laser is a vertical discharge-excited pulsed laser.

* * * * *